United States Patent
Karayianni et al.

(10) Patent No.: US 7,790,790 B2
(45) Date of Patent: Sep. 7, 2010

(54) FLAME RETARDANT THERMOPLASTIC ELASTOMER COMPOSITIONS

(75) Inventors: Eleni Karayianni, Geneva (CH); Jean-Michel Philippoz, Prangins (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 486 days.

(21) Appl. No.: 11/982,510

(22) Filed: Nov. 2, 2007

(65) Prior Publication Data

US 2009/0176091 A1 Jul. 9, 2009

Related U.S. Application Data

(60) Provisional application No. 60/858,765, filed on Nov. 14, 2006.

(51) Int. Cl.
*C08K 5/5313* (2006.01)
(52) U.S. Cl. ........ 524/126; 524/133; 174/110 AR; 174/110 SR
(58) Field of Classification Search ........ 174/110 AR, 174/110 SR; 524/126, 133
See application file for complete search history.

(56) References Cited

U.S. PATENT DOCUMENTS

| | | | |
|---|---|---|---|
| 4,180,495 A | 12/1979 | Sandler | |
| 5,780,534 A | 7/1998 | Kleiner | |
| 6,013,707 A | 1/2000 | Kleiner | |
| 6,255,371 B1 | 7/2001 | Schlosser | |
| 6,270,560 B1 | 8/2001 | Kleiner | |
| 7,074,857 B2 | 7/2006 | Bendler | |
| 2003/0083442 A1* | 5/2003 | Nishihara et al. | 525/464 |
| 2004/0115450 A1 | 6/2004 | Bendler | |
| 2005/0084694 A1 | 4/2005 | Bendler | |

FOREIGN PATENT DOCUMENTS

EP 0 699 708 A1 3/1996

OTHER PUBLICATIONS

International Preliminary Report on Patentability Issued by the EPO as IPEA in the corresponding PCT application, dated May 28, 2009.

* cited by examiner

*Primary Examiner*—Peter Szekely

(57) ABSTRACT

Flame retardant thermoplastic elastomer composition comprising a thermoplastic vulcanizate composition and non-halogenated flame retardant.

25 Claims, No Drawings

FLAME RETARDANT THERMOPLASTIC ELASTOMER COMPOSITIONS

CROSS REFERENCE TO RELATED APPLICATIONS

This application claims the benefit of U.S. Provisional Application No. 60/858,765, filed Nov. 14, 2006.

FIELD OF THE INVENTION

The present invention relates to a flame retardant thermoplastic elastomer composition comprising a melt-processable thermoplastic vulcanizate and non-halogenated flame retardant.

BACKGROUND OF THE INVENTION

As a result of their excellent tear strengths, tensile strengths, flex lives, abrasion resistances, and broad useful end-use temperature ranges, thermoplastic polyetherester elastomers are used in a wide range of applications. However, in certain applications it is desirable that thermoplastic polyetherester elastomer compositions be flame retardant. In some applications, halogenated, and in particular, brominated flame retardants can be used, but the use of such materials has drawbacks. For example, they may decompose or degrade at the processing temperatures used to prepare and mold the compositions, and the resulting degradation products can corrode the barrels of compounding extruders, surfaces of a molding machines, and other equipment. Furthermore, the degradation products can result in molded articles having poor surface appearance.

Thus it would be desirable to obtain a flame retardant thermoplastic elastomer composition that contains non-halogenated flame retardant. It would be particularly desirable to obtain such a composition that has good retention of physical properties after heat aging in air.

U.S. Pat. No. 7,074,857 and US patent application publication 2005/084694 describe melt-processable thermoplastic elastomeric compositions (also called thermoplastic vulcanizate compositions). U.S. Pat. No. 4,180,495 discloses the use of phosphinate salts to flame retard polyesters and polyamides. U.S. Pat. No. 6,255,371 discloses flame retardant comprising phosphinates, disphosphinates, or polymers thereof. U.S. Pat. Nos. 5,780,534 and 6,013,707 disclose flame retarded polyester compositions containing calcium or aluminum salts of phosphinic acid or diphosphinic acid. U.S. Pat. No. 6,270,560 discloses salt mixtures made from aluminum phosphinates, aluminum hydroxide and/or aluminum phosphonates and/or aluminum phosphates suitable as flame retardants for polymeric molding compositions.

SUMMARY OF THE INVENTION

Disclosed and claimed herein are flame retardant thermoplastic elastomer compositions comprising;
(a) about 70 to about 99 weight percent of a melt-processable thermoplastic vulcanizate composition comprising:
 (i) from about 15 to about 75 weight percent of at least one thermoplastic polyester continuous phase; and
 (ii) from about 25 to about 85 weight percent of at least one poly(meth)acrylate or polyethylene/(meth)acrylate rubber disperse phase wherein said rubber is dynamically cross-linked with at least one peroxide free-radical initiator and at least one organic multiolefinic co-agent; and (b) about 1 to about 30 weight percent, of at least one flame retardant comprising a phosphinate of the formula (I) and/or a disphosphinate of the formula (II) and/or polymers of thereof

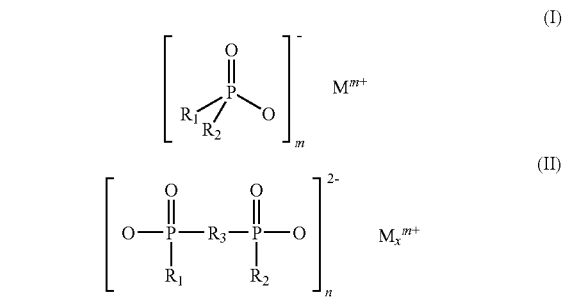

wherein $R_1$ and $R_2$ are identical or different and are hydrogen, $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is calcium ions, magnesium ions, aluminum ions, and/or zinc ions, m is 2 to 3; n is 1 or 3; and x is 1 or 2, wherein the weight percentages of (a) and (b) are based on the total weight of (a)+(b) and the weight percentages of (i) and (ii) are based on the total weight of (i)+(ii). Further disclosed and claimed are articles made therefrom.

DETAILED DESCRIPTION OF THE INVENTION

The flame retardant thermoplastic elastomer composition of the present invention comprises a melt-processable thermoplastic vulcanizate composition (a) and a non-halogenated flame retardant (b). The melt-processable thermoplastic vulcanizate composition (a) is present in about 70 to about 99 weight percent, or preferably about 80 to about 98 weight percent, or more preferably about 85 to about 97 weight percent, based on the total weight of (a)+(b). The non-halogenated flame retardant (b) is present in about 1 to about 30 weight percent, or preferably about 2 to about 20 weight percent, or more preferably about 3 to about 15 weight percent, based on the total weight of (a)+(b).

The melt-processable thermoplastic vulcanizate composition used in the present invention is described in U.S. Pat. No. 7,074,857 and US patent application publication 2005/084694, which are hereby incorporated by reference herein. The melt-processable thermoplastic vulcanizate composition comprises (i) from about 15 to about 75 weight percent, or preferably from about 15 to about 60 weight percent, of at least one thermoplastic polyester that forms a continuous phase; and (ii) from about 25 to about 85 weight percent, or preferably from about 40 to about 85 weight percent, of at least one poly(meth)acrylate or polyethylene/(meth)acrylate rubber that forms a disperse phase (where the disperse phase is dispersed in the continuous phase), wherein said rubber is dynamically cross-linked with a peroxide free-radical initiator and an organic multiolefinic co-agent, where the weight percentages of components (i) and (ii) are based on the total weight of (i)+(ii).

As used herein, the term "(meth)acrylic acid" refers to methacrylic acid and/or acrylic acid; the term "(meth)acrylate" refers to methacrylate and/or acrylate and the term "poly (meth)acrylate refers to polymers derived from the polymerization of methacrylate and/or acrylate monomers. As used herein, the term "thermoplastic polyester" refers to component (i) and includes thermoplastic polyester elastomers. As used herein, the term "acrylate rubber" refers to poly(meth) acrylate or polyethylene/(meth)acrylate rubber.

The acrylate rubber may be prepared by copolymerizing one or more (meth)acrylate monomers with one or more olefins. A preferred olefin is ethylene. As used herein, the term "cross-linked acrylate rubber" refers to component (ii). Preferred acrylate rubbers include poly(alkyl (meth)acrylate) rubbers, ethylene/alkyl (meth)acrylate copolymer rubber and poly(perfluoroalkyl (meth)acrylate) rubber, and are more preferably an ethylene/alkyl (meth)acrylate copolymer rubbers where the alkyl group has from 1 to 4 carbons. Preferred ethylene/alkyl (meth)acrylate copolymers are those derived from less than about 80 weight percent of ethylene and more than about 20 weight percent alkyl (meth)acrylate.

The acrylate rubbers may optionally comprise additional repeat units derived from one or more functionalized comonomers, such as (meth)acrylate glycidyl esters (such as glycidyl methacrylate), maleic acid, or other comonomer having one or more reactive groups including acid, hydroxyl, epoxy, isocyanates, amine, oxazoline, chloroacetate, or diene functionality.

The acrylate rubbers may also be made from more than two (meth)acrylate monomers. Examples are acrylate rubbers made by polymerizing ethylene, methyl acrylate, and a second acrylate (such as butyl acrylate).

In one embodiment of the present invention, the melt processable thermoplastic vulcanizate composition may be prepared by mixing at least one thermoplastic polyester with at least one acrylate rubber in the presence of an organic peroxide free-radical initiator and organic diene co-agent as described in U.S. Pat. No. 7,074,857 and US patent application publication 2005/084694.

Suitable peroxide free-radical initiators preferably decompose rapidly at the temperature of dynamic cross-linking. Examples include 2,5-dimethyl-2,5-di-(t-butylperoxy)-3-hexyne; t-butyl peroxybenzoate; 2,5-dimethyl-2,5-di-(t-butylperoxy)-2,5-dimethylhexane; dicumyl peroxide; α,α-bis (t-butylperoxy)-2,5-dimethylhexane; and the like.

Suitable organic multiolefinic cross-linking co-agents include, but are not limited to, diethyleneglycol diacrylate; diethyleneglycol dimethacrylate; N,N'-m-phenylene dimaleimide; triallylisocyanurate; trimethylolpropane trimethacrylate; tetraallyloxyethane; triallyl cyanurate; tetramethylene diacrylate; polyethylene glycol dimethacrylate; and the like.

The actual mixing of components and subsequent dynamic cross-linking may be done using any method known to those skilled in the art. For example, it may be performed either in a batch mode or a continuous mode using conventional melt blending equipment as generally practiced in the art.

Preferred thermoplastic polyesters are typically derived from one or more dicarboxylic acids (where herein the term "dicarboxylic acid" also refers to dicarboxylic acid derivatives such as esters) and one or more diols. In preferred polyesters the dicarboxylic acids comprise one or more of terephthalic acid, isophthalic acid, and 2,6-naphthalene dicarboxylic acid, and the diol component comprises one or more of $HO(CH_2)_nOH$ (I); 1,4-cyclohexanedimethanol; $HO(CH_2CH_2O)_mCH_2CH_2OH$ (II); and $HO(CH_2CH_2CH_2CH_2O)_zCH_2CH_2CH_2CH_2OH$ (III), wherein n is an integer of 2 to 10, m on average is 1 to 4, and z is on average about 7 to about 40. Note that (II) and (III) may be a mixture of compounds in which m and z, respectively, may vary and that since m and z are averages, they do not have to be integers. Other dicarboxylic acids that may be used to form the thermoplastic polyester include sebacic and adipic acids. Hydroxycarboxylic acids such as hydroxybenzoic acid may be used as comonomers. Specific preferred polyesters include poly(ethylene terephthalate) (PET), poly(trimethylene terephthalate) (PTT), poly(1,4-butylene terephthalate) (PBT), poly(ethylene 2,6-naphthoate), and poly(1,4-cyclohexyldimethylene terephthalate) (PCT).

The thermoplastic polyester may be a thermoplastic polyester elastomer, such as a copolyetherester. Useful copolyetheresters are copolymers that have a multiplicity of recurring long-chain ester units and short-chain ester units joined head-to-tail through ester linkages, said long-chain ester units being represented by formula (A):

(A)

and said short-chain ester units being represented by formula (B):

(B)

wherein

G is a divalent radical remaining after the removal of terminal hydroxyl groups from poly(alkylene oxide)glycols having a number average molecular weight of between about 400 and about 6000, or preferably between about 400 and about 3000;

R is a divalent radical remaining after removal of carboxyl groups from a dicarboxylic acid having a molecular weight of less than about 300;

D is a divalent radical remaining after removal of hydroxyl groups from a diol having a molecular weight less than about 250; and wherein said copolyetherester(s) preferably contain from about 15 to about 99 weight percent short-chain ester units and about 1 to about 85 weight percent long-chain ester units, or wherein the copolyetherester(s) more preferably contain from about 20 to about 95 weight percent short-chain ester units and about 5 to about 80 weight percent long-chain ester units.

As used herein, the term "long-chain ester units" as applied to units in a polymer chain refers to the reaction product of a long-chain glycol with a dicarboxylic acid. Suitable long-chain glycols are poly(alkylene oxide) glycols having terminal (or as nearly terminal as possible) hydroxy groups and having a number average molecular weight of from about 400 to about 6000, and preferably from about 600 to about 3000. Preferred poly(alkylene oxide) glycols include poly(tetramethylene oxide) glycol, poly(trimethylene oxide) glycol, poly (propylene oxide) glycol, poly(ethylene oxide) glycol, copolymer glycols of these alkylene oxides, and block copolymers such as ethylene oxide-capped poly(propylene oxide) glycol. Mixtures of two or more of these glycols can be used.

The term "short-chain ester units" as applied to units in a polymer chain of the copolyetheresters refers to low molecular weight compounds or polymer chain units having molecular weights less than about 550. They are made by reacting a low molecular weight diol or a mixture of diols (molecular weight below about 250) with a dicarboxylic acid to form ester units represented by Formula (B) above.

Included among the low molecular weight diols which react to form short-chain ester units suitable for use for preparing copolyetheresters are acyclic, alicyclic and aromatic dihydroxy compounds. Preferred compounds are diols with about 2-15 carbon atoms such as ethylene, propylene, isobutylene, tetramethylene, 1,4-pentamethylene, 2,2-dimethyltrimethylene, hexamethylene and decamethylene glycols, dihydroxycyclohexane, cyclohexane dimethanol, resorcinol, hydroquinone, 1,5-dihydroxynaphthalene, etc. Especially preferred diols are aliphatic diols containing 2-8 carbon atoms, and a more preferred diol is 1,4-butanediol. Included among the bisphenols which can be used are bis(p-hydroxy) diphenyl, bis(p-hydroxyphenyl)methane, and bis(p-hydroxyphenyl)propane. Equivalent ester-forming derivatives of diols are also useful (e.g., ethylene oxide or ethylene carbonate can be used in place of ethylene glycol or resorcinol diacetate can be used in place of resorcinol). As used herein, the term "diols" includes equivalent ester-forming derivatives such as those mentioned. However, any molecular weight requirements refer to the corresponding diols, not their derivatives.

Dicarboxylic acids that can react with the foregoing long-chain glycols and low molecular weight diols to produce the copolyetheresters are aliphatic, cycloaliphatic or aromatic dicarboxylic acids of a low molecular weight, i.e., having a molecular weight of less than about 300. The term "dicarboxylic acids" as used herein includes functional equivalents of dicarboxylic acids that have two carboxyl functional groups that perform substantially like dicarboxylic acids in reaction with glycols and diols in forming copolyetherester polymers. These equivalents include esters and ester-forming derivatives such as acid halides and anhydrides. The molecular weight requirement pertains to the acid and not to its equivalent ester or ester-forming derivative. Thus, an ester of a dicarboxylic acid having a molecular weight greater than 300 or a functional equivalent of a dicarboxylic acid having a molecular weight greater than 300 are included provided the corresponding acid has a molecular weight below about 300. The dicarboxylic acids can contain any substituent groups or combinations that do not substantially interfere with the copolyetherester polymer formation and use of the polymer in the compositions of this invention.

The term "aliphatic dicarboxylic acids," as used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation often cannot be used because of homopolymerization. However, some unsaturated acids, such as maleic acid, can be used.

Aromatic dicarboxylic acids, as the term is used herein, are dicarboxylic acids having two carboxyl groups each attached to a carbon atom in a carbocyclic aromatic ring structure. It is not necessary that both functional carboxyl groups be attached to the same aromatic ring and where more than one ring is present, they can be joined by aliphatic or aromatic divalent radicals or divalent radicals such as —O— or —$SO_2$—.

Representative useful aliphatic and cycloaliphatic acids that can be used include sebacic acid; 1,3-cyclohexanedicarboxylic acid; 1,4-cyclohexanedicarboxylic acid; 1,2-cyclohexanedicarboxylic acid; adipic acid; glutaric acid; 2-ethylsuberic acid; cyclopentanedicarboxylic acid; decahydro-1,5-naphthylene dicarboxylic acid; 4,4'-bicyclohexyl dicarboxylic acid; decahydro-2,6-naphthylene dicarboxylic acid; 4,4'-methylenebis(cyclohexyl) carboxylic acid; and 3,4-furan dicarboxylic acid. Preferred acids are cyclohexane-dicarboxylic acids and adipic acid.

Representative aromatic dicarboxylic acids include phthalic, terephthalic and isophthalic acids; bibenzoic acid; substituted dicarboxy compounds with two benzene nuclei such as bis(p-carboxyphenyl)methane; p-oxy-1,5-naphthalene dicarboxylic acid; 2,6-naphthalene dicarboxylic acid; 2,7-naphthalene dicarboxylic acid; 4,4'-sulfonyl dibenzoic acid and $C_1$-$C_{12}$ alkyl and ring substitution derivatives thereof, such as halo, alkoxy, and aryl derivatives. Hydroxyl acids such as p-(beta-hydroxyethoxy)benzoic acid can also be used provided an aromatic dicarboxylic acid is also used.

Aromatic dicarboxylic acids are a preferred class for preparing the copolyetherester polymers useful for this invention. Among the aromatic acids, those with 8-16 carbon atoms are preferred, particularly terephthalic acid alone or with a mixture of phthalic and/or isophthalic acids.

The copolyetheresters preferably comprise about 15 to about 99 weight percent short-chain ester units corresponding to Formula (B) above, the remainder being long-chain ester units corresponding to Formula (A) above. The copolyetheresters more preferably comprise about 20 to about 95 weight percent, and even more preferably about 50 to about 90 weight percent short-chain ester units, where the remainder is long-chain ester units. More preferably, at least about 70% of the groups represented by R in Formulae (A) and (B) above are 1,4-phenylene radicals and at least about 70% of the groups represented by D in Formula (B) above are 1,4-butylene radicals and the sum of the percentages of R groups which are not 1,4-phenylene radicals and D groups that are not 1,4-butylene radicals does not exceed 30%. If a second dicarboxylic acid is used to make the copolyetherester, isophthalic acid is preferred and if a second low molecular weight diol is used, ethylene glycol, 1,3-propanediol, cyclohexanedimethanol, or hexamethylene glycol are preferred.

A blend or mixture of two or more copolyetherester elastomers can be used. The copolyetherester elastomers used in the blend need not on an individual basis come within the values disclosed hereinbefore for the elastomers. However, the blend of two or more copolyetherester elastomers must conform to the values described herein for the copolyetheresters on a weighted average basis. For example, in a mixture that contains equal amounts of two copolyetherester elastomers, one copolyetherester can contain 60 weight percent short-chain ester units and the other copolyetherester can contain 30 weight percent short-chain ester units for a weighted average of 45 weight percent short-chain ester units.

Preferably, the copolyetherester elastomers are prepared from esters or mixtures of esters of terephthalic acid and isophthalic acid, 1,4-butanediol and poly(tetramethylene ether)glycol or poly(trimethylene ether) glycol or ethylene oxide-capped polypropylene oxide glycol, or are prepared from esters of terephthalic acid, e.g. dimethylterephthalate, 1,4-butanediol and poly(ethylene oxide)glycol. More preferably, the copolyetherester elastomers are prepared from esters of terephthalic acid, e.g. dimethylterephthalate, 1,4-butanediol and poly(tetramethylene ether)glycol.

The flame retardants in the thermoplastic elastomer compositions in this invention are flame retardant combinations (such as those disclosed in U.S. Pat. No. 6,255,371) comprising a phosphinate of the formula (I) and/or a diphosphinate of the formula (II) and/or polymers of these,

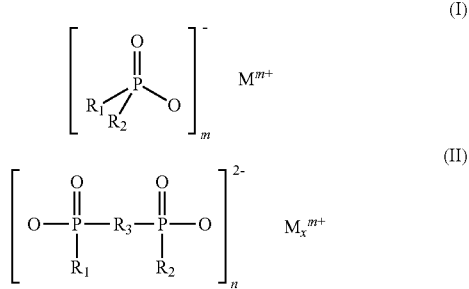

wherein $R_1$ and $R_2$ are identical or different and are hydrogen, $C_1$-$C_6$ alkyl, linear, or branched, and/or aryl; $R_3$ is $C_1$-$C_{10}$-alkylene, linear, or branched, $C_6$-$C_{10}$-arylene, -alkylarylene or -arylalkylene; M is calcium, magnesium, aluminum, and/or zinc; m is 2 to 3; n is 1 or 3; and x is 1 or 2; and optionally comprising, condensation products of melamine and/or reaction products of melamine with phosphoric acid and/or reaction products of condensation products of melamine with phosphoric acid and/or comprising a mixture of these.

$R_1$ and $R_2$ may be identical or different and are preferably hydrogen, methyl, ethyl, n-propyl, isopropyl, n-butyl, tert-butyl, n-pentyl and/or phenyl. $R_3$ is preferably methylene, ethylene, n-propylene, isopropylene, n-butylene, tert-butylene, n-pentylene, n-octylene, n-dodecylene, or phenylene or naphthylene, or methylphenylene, ethylphenylene, tert-butylphenylene, methylnaphthylene, ethylnaphthylene or tert-butylnaphthylene, or phenylmethylene, phenylethylene, phenylpropylene or phenylbutylene. M is preferably aluminum or zinc.

Preferred phosphinates are metal salts of organic phosphinates, such as methylethylphosphinates and diethylphosphinates. More preferred are aluminum methylethylphosphinate, aluminum diethylphosphinate, zinc methylethylphosphinate, and zinc diethylphosphinate. Also preferred are aluminum phosphinate, magnesium phosphinate, calcium phosphinate, and zinc phosphinate.

The flame retardant can have any particle size distribution, as commonly understood and used by those having skill in the field, but preferably it has a particle size (D90 value) of less than or equal to 100 microns and more preferably less than or equal to 20 microns. The D90 value corresponds to a particle size below which 90 wt-% of the particles lie, wherein the particle size distribution was measured by the technique of laser diffraction from a suspension of particles in a solvent using a particle size analyzer, Mastersizer 2000 from Malvern. This test method meets the requirements set forth in ISO 13320.

The compositions of the present invention may optionally further comprise one or more heat stabilizers and/or antioxidants. Examples of suitable heat stabilizers and/or antioxidants include diphenylamines, amides, thioesters, phenolic antioxidants, and phosphites. When used, the heat stabilizers and/or antioxidants are preferably present in about 0.01 to about 5 weight percent, or more preferably in about 0.01 to 1 weight percent, based on the total weight of the composition.

The compositions of the present invention may further comprise additional additives such as synergists, colorants, lubricants, fillers and reinforcing agents, viscosity modifiers, nucleating agents, plasticizers, mold release agents, flame retardants, scratch and mar modifiers, drip suppressants, and impact modifiers. When used, additional additives are preferably present in about 0.1 to about 20 weight percent, based on the total weight of the composition.

The compositions of the present invention may optionally further comprise one or more surface modifiers (e.g. high molecular weight siloxanes) and/or metal deactivators (e.g. hydrazine and/or hydrazide).

The compositions of the present invention may optionally further comprise one or more amorphous polymers, such as polycarbonate, poly(methyl (meth)acrylate), and/or polyarylates. When present, the one or more amorphous polymers preferably comprise about 1 to about 30 weight percent, or more preferably about 10 to about 20 weight percent of the total composition. Compositions of the present invention containing one or more amorphous polymers are particularly suited for wire and cable coating and preferably such compositions further comprise one or more surface modifiers and/or metal deactivators and/or heat stabilizers and/or antioxidants.

The compositions of the present invention are melt-mixed blends. Any melt-mixing method may be used to combine the polymeric components and non-polymeric ingredients of the present invention.

For example, the polymeric components and non-polymeric ingredients may be added to a melt mixer, such as, for example, a single or twin-screw extruder; a blender; a kneader; or a Banbury mixer, either all at once through a single step addition, or in a stepwise fashion, and then melt-mixed. When adding the polymeric components and non-polymeric ingredients in a stepwise fashion, part of the polymeric components and/or non-polymeric ingredients are first added and melt-mixed with the remaining polymeric components and non-polymeric ingredients being subsequently added and further melt-mixed until a well-mixed composition is obtained.

The composition of the present invention may be formed into articles using methods known to those skilled in the art, such as, for example, injection molding, blow molding, extrusion, thermoforming, melt casting, rotational molding, and slush molding.

The compositions of the present invention have the particular advantage of having high elongation, good chemical and temperature resistance, and particularly good retention of physical properties after long-term heat aging in air at temperatures as high as 150° C. Furthermore, these compositions have good electrical properties. This unique combination of properties makes them very attractive candidates for use in wire and cable applications. One such application is for automotive primary cables following the standard requirements of ISO 6722:2002. This standard specifies eight temperature classes, each with its own temperature range, according to which the cable must pass long-term aging (3000 h) at the highest temperature of the designated class, as well as a cold winding test at the lowest temperature of the designated class. The compositions of this invention could be particularly useful as Class C (−40° C. to 125° C.) and as Class D (−40° C. to 150° C.) cables. The compositions could be suitable for use in 125° C.-150° C. appliance cables. As the compositions of this invention exhibit a very good flame retardancy even when in the form of low thickness articles, thin wall applications such as wires and films may be of particular interest.

EXAMPLES

The following ingredients are referred to in the tables:

Thermoplastic vulcanizate A: a melt-mixed blend of 95 weight percent of thermoplastic vulcanizate ETPV 90A01

NC010 supplied by E.I. du Pont de Nemours and Co., Wilmington, Del. with 5 weight percent of Hytrel® 30HS, a copolyetherester stabilizer masterbatch supplied by E.I. du Pont de Nemours and Co., Wilmington, Del.

Thermoplastic vulcanizate B: ETPV 95A02 HS BK001 supplied by E.I. du Pont de Nemours and Co., Wilmington, Del.

Copolyetherester C: a melt-mixed blend of 95 weight percent of Hytrel® 6356, a copolyetherester supplied by E.I. du Pont de Nemours and Co., Wilmington, Del. with 5 weight percent of Hytrel® 30HS.

Phosphinate flame retardant A: Exolit® OP950, a Zn salt of diethyl phosphinate supplied by Clariant.

Phosphinate flame retardant B: Exolit® OP1230, an Al salt of diethyl phosphinate supplied by Clariant.

Phosphinate flame retardant C: Phoslite® IP-A, an Al hypophosphite supplied by Italmatch Chemicals.

The compositions of the examples (abbreviated in the tables as "Ex.") and comparative examples (abbreviated in the tables as "CE") are prepared by melt-blending the components. In the case of compositions where the flame retardant was present in greater than 15 weight percent, melt blending was done in a twin-screw extruder having barrel temperatures set at about 220 to about 240° C. Polymeric ingredients are fed through the main feeder into the barrel furthest from the die. Flame retardant additives are introduced via side feeders. In the case of compositions that contain flame retardant and where the flame retardant was present in 15 weight percent or less, melt blending was done at the injection molding step when the compositions were molded into test specimens. This was done by preparing a composition containing the appropriate polymeric material (thermoplastic vulcanizate or copolyetherester) and higher concentrations of flame retardant using a twin-screw extruder and cube-blending the composition with pellets of the polymeric material that did not contain flame retardant. The resulting cube blend was fed to the injection molding machine.

Flammability testing was performed according to UL 94 test standard, 20 mm vertical burning test. Test specimens were formed from the compositions of Tables 1, 2, and 3 by injection molding in the form of test bars of dimensions 125 mm long by 13 mm wide by 0.8, 1.6, or 3.2 mm thick. According to this procedure a specimen is clamped with the longitudinal axis vertical, so that the lower end of the specimen is 300 mm above a horizontal layer of dry absorbent surgical cotton. A burner producing a blue flame 20 mm high is placed such that the flame is applied centrally to the middle point of the bottom edge of the specimen for 10 seconds. After the application of the flame to the specimen for 10 seconds, the burner is withdrawn from the sample and the after-flame time, $t_1$, is measured. When after-flaming of the test specimen stops, the burner is again placed under the specimen for an additional 10 seconds. After this the flame is withdrawn from the sample and the second after-flame time, $t_2$, is measured. Materials are classified according to the test specifications as V-0, V-1 or V-2, based on the behavior of the material during burning. When the material fails to meet the criteria for the least demanding classification (V-2), it is reported as "failed" in the tables.

Flammability was measured on all compositions after preconditioning the samples for 48 hours at 23° C. and 50 percent relative humidity, and these results are reported in Tables 1 to 3. For most compositions, the flammability was also measured after preconditioning the samples for 1 week at 70° C., and the results were found identical to those obtained with the other preconditioning.

Measurements of tensile properties were done according to ISO 527 using injection-molded tensile specimens having a dumbbell shape.

Heat aging in air was performed in ovens with forced air circulation, using the same injection-molded tensile specimens having a dumbbell shape. After the desired aging time, the samples are conditioned at 23° C. and 50 percent relative humidity for at least 24 hours and tensile properties are measured at room temperature.

It can be seen in Table 1 that the phosphinate flame retardant A does not impart flame retardancy to the copolyetherester C, and strongly hurts its retention of elongation at break upon ageing. In contrast, when the same phosphinate flame retardant A is incorporated in the thermoplastic vulcanizates A and B, the materials obtain V-2 flammability ratings and also show a good retention of elongation at break upon ageing, both at 125 and 150° C.

Table 2 shows that the phosphinate flame retardant B provides good flammability performance in both thermoplastic vulcanizate A and in copolyetherester C. In both cases, V-2 ratings are obtained over a broad range of concentration, and a rating of V-0 is obtained at high levels of flame retardant and/or greater thicknesses. However, it also appears clearly that the ageing performance is strongly adversely affected in copolyetherester C, even at the lower aging temperature of 125° C. In contrast, in the case of thermoplastic vulcanizate A, the retention of elongation at break is still good at the higher aging temperature of 150° C.

TABLE 1

|  | CE 1 | Ex. 1 | Ex. 2 | Ex. 3 | Ex. 4 | Ex. 5 | CE 2 | CE 3 | CE 4 | CE 5 | Ex. 6 | Ex. 7 | Ex. 8 |
|---|---|---|---|---|---|---|---|---|---|---|---|---|---|
| Thermoplastic vulcanizate A | 100 | 95.5 | 90 | 85 | 80 | 70 | — | — | — | — | — | — | — |
| Thermoplastic vulcanizate B | — | — | — | — | — | — | — | — | — | 100 | 90 | 85 | 80 |
| Copolyetherester C | — | — | — | — | — | — | 100 | 85 | 70 | — | — | — | — |
| Phosphinate flame retardant A | — | 4.5 | 10 | 15 | 20 | 30 | — | 15 | 30 | — | 10 | 15 | 20 |
| Flammability testing (0.8 mm bars) | failed | V-2 | V-2 | V-2 | V-2 | V-2 | failed | failed | failed | failed | V-2 | V-2 | V-2 |
| Flammability testing (1.6 mm bars) | failed | V-2 | — | V-2 | — | — | — | — | — | failed | V-2 | — | V-2 |
| Flammability testing (3.2 mm bars) | failed | V-2 | — | V-2 | — | — | — | — | — | failed | V-2 | V-2 | V-2 |
| Elongation at break - before aging (%) | 133 | — | 158 | — | 151 | — | 354 | 417 | 500 | 184 | 182 | 174 | 164 |
| Elongation at break - after aging at 125° C. for 3000 h (%) | 137 | — | 209 | — | 240 | — | 203 | 10 | 7 | 123 | 156 | 176 | 181 |

TABLE 1-continued

| | CE 1 | Ex. 1 | Ex. 2 | Ex. 3 | Ex. 4 | Ex. 5 | CE 2 | CE 3 | CE 4 | CE 5 | Ex. 6 | Ex. 7 | Ex. 8 |
|---|---|---|---|---|---|---|---|---|---|---|---|---|---|
| Ratio of elongation at break after aging at 125° C. for 3000 h to elongation at break before aging | 1.03 | — | 1.33 | — | 1.60 | — | 0.57 | 0.02 | 0.01 | 0.67 | 0.86 | 1.01 | 1.10 |
| Elongation at break - after aging at 150° C. for 3000 h (%) | 99 | — | 81 | — | 80 | — | 8 | 1 | 1 | 99 | 122 | 94 | 82 |
| Ratio of elongation at break after aging at 150° C. for 3000 h to elongation at break before aging | 0.74 | — | 0.51 | — | 0.53 | — | 0.02 | <0.01 | <0.01 | 0.54 | 0.67 | 0.54 | 0.50 |

Ingredient quantities are given in weight percent relative to the total weight of the composition.

TABLE 2

| | Ex. 9 | Ex. 10 | Ex. 11 | Ex. 12 | CE 6 | CE 7 | CE 8 |
|---|---|---|---|---|---|---|---|
| Thermoplastic vulcanizate A | 95 | 85 | 80 | 70 | — | — | — |
| Copolyetherester C | — | — | — | — | 91 | 85 | 70 |
| Phosphinate flame retardant B | 5 | 15 | 20 | 30 | 9 | 15 | 30 |
| Flammability testing (0.8 mm bars) | V-2 | V-2 | V-2 | V-0 | V-2 | V-2 | V-0 |
| Flammability testing (1.6 mm bars) | V-2 | — | V-2 | — | V-2 | V-2 | V-0 |
| Flammability testing (3.2 mm bars) | V-2 | — | V-0 | — | V-2 | V-0 | V-0 |
| Elongation at break - before aging (%) | — | 115 | — | 76 | 296 | 307 | 70 |
| Elongation at break - after aging at 125° C. for 3000 h (%) | — | 137 | — | 91 | <28 (2000 h) | <10 (2000 h) | <4 (2000 h) |
| Ratio of elongation at break after aging at 125° C. for 3000 h to elongation at break before aging | — | 1.19 | — | 1.20 | <0.09 | <0.03 | <0.05 |
| Elongation at break - after aging at 150° C. for 3000 h (%) | — | 62 | — | 32 | <12 (2000 h) | <9 (2000 h) | <3 (2000 h) |
| Ratio of elongation at break after aging at 150° C. for 3000 h to elongation at break before aging | — | 0.54 | — | 0.42 | <0.04 | <0.03 | <0.04 |

Ingredient quantities are given in weight percent relative to the total weight of the composition.

TABLE 3

| | CE 1 | Ex. 13 | Ex. 14 | CE 2 | CE 9 | CE 5 | Ex. 15 |
|---|---|---|---|---|---|---|---|
| Thermoplastic vulcanizate A | 100 | 85 | 70 | — | — | — | — |
| Thermoplastic vulcanizate B | — | — | — | — | — | 100 | 70 |
| Copolyetherester C | — | — | — | 100 | 70 | — | — |
| Phosphinate flame retardant C | — | 15 | 30 | — | 30 | — | 30 |
| Flammability testing (0.8 mm bars) | failed | failed | failed | failed | V-2 | failed | — |
| Flammability testing (1.6 mm bars) | — | — | — | — | — | — | V-0 |

Ingredient quantities are given in weight percent relative to the total weight of the composition.

What is claimed is:

1. A flame retardant thermoplastic elastomer composition comprising;
   (a) about 70 to about 99 weight percent of a melt-processable thermoplastic vulcanizate composition comprising:
      (i) from about 15 to about 75 weight percent of at least one thermoplastic polyester continuous phase; and
      (ii) from about 25 to about 85 weight percent of at least one poly(meth)acrylate or polyethylene/(meth)acrylate rubber disperse phase wherein said rubber is dynamically cross-linked with at least one peroxide free-radical initiator and at least one organic multi-olefinic co-agent; and
   (b) about 1 to about 30 weight percent, of at least one flame retardant comprising a phosphinate of the formula (I) and/or a disphosphinate of the formula (II) and/or polymers of thereof

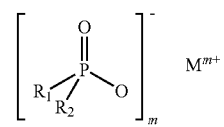

(I)

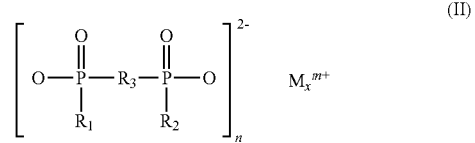

(II)

wherein $R_1$ and $R_2$ are identical or different and are hydrogen, $C_1$-$C_6$ alkyl, linear or branched, and/or aryl; $R_3$ is $C_1$-$C_{10}$-alkylene, linear or branched, $C_6$-$C_{10}$-arylene, -alkylarylene or -arylalkylene; M is calcium ions, magnesium ions, aluminum ions, and/or zinc ions, m is 2 to 3; n is 1 or 3; and x is 1 or 2, wherein the weight percentages of (a) and (b) are based on the total weight of (a)+(b) and the weight percentages of (i) and (ii) are based on the total weight of (i)+(ii).

2. The thermoplastic elastomer composition of claim 1, wherein the flame retardant is aluminum phosphinate, aluminum diethyl phosphinate and/or zinc diethyl phosphinate.

3. The thermoplastic elastomer composition of claim 1, wherein the flame retardant has a particle size (D90 value) less than or equal to 100 microns.

4. The thermoplastic elastomer composition of claim 1, wherein the flame retardant has a particle size (D90 value) less than or equal to 20 microns.

5. The thermoplastic elastomer composition of claim 1, wherein thermoplastic vulcanizate composition (a) is present in about 80 to about 98 weight percent and flame retardant (b) is present in about 2 to about 20 weight percent.

6. The thermoplastic elastomer composition of claim 1, wherein thermoplastic vulcanizate composition (a) is present in about 85 to about 97 weight percent and flame retardant (b) is present in about 3 to about 15 weight percent.

7. The thermoplastic elastomer composition of claim 1, wherein the thermoplastic vulcanizate comprises about 15 to about 60 weight percent of component (i) and about 40 to about 85 weight percent of component (ii).

8. The thermoplastic elastomer composition of claim 1 further comprising one or more heat stabilizers and/or antioxidants.

9. The thermoplastic elastomer composition of claim 1 further comprising one or more surface modifiers and/or metal deactivators.

10. The thermoplastic elastomer composition of claim 8 further comprising one or more surface modifiers and/or metal deactivators.

11. The thermoplastic elastomer composition of claim 1 further comprising one or more amorphous polymers.

12. The thermoplastic elastomer composition of claim 11, wherein the one or more amorphous polymers are polycarbonate, poly(methyl (meth)acrylate), and/or polyarylates.

13. The thermoplastic elastomer composition of claim 11 further comprising one or more surface modifiers and/or metal deactivators and/or heat stabilizers and/or antioxidants.

14. The thermoplastic elastomer composition of claim 1, wherein the thermoplastic polyester continuous phase (i) comprises at least one copolyetherester elastomer.

15. The thermoplastic elastomer composition of claim 14, wherein the copolyetherester elastomer is prepared from monomers comprising poly(tetramethylene oxide) glycol; isophthalic acid and/or terephthalic acid; and 1,4-butanediol and/or 1,3-propanediol.

16. The thermoplastic elastomer composition of claim 14, wherein the copolyetherester elastomer is prepared from monomers comprising poly(trimethylene oxide) glycol; isophthalic acid and/or terephthalic acid; and 1,4-butanediol and/or 1,3-propanediol.

17. The thermoplastic elastomer composition of claim 1, wherein the free-radical initiator is one or more of 2,5-dimethyl-2,5-di-(t-butylperoxy)-3-hexyne; t-butyl peroxybenzoate; 2,5-dimethyl-2,5-di-(t-butylperoxy)-2,5-dimethylhexane; dicumyl peroxide; and $\alpha,\alpha$-bis(t-butylperoxy)-2,5-dimethylhexane.

18. The thermoplastic elastomer composition of claim 1, wherein the organic multifunctional cross-linking co-agent is one or more of diethyleneglycol diacrylate; diethyleneglycol dimethacrylate; N,N'-m-phenylene dimaleimide; triallylisocyanurate; trimethylolpropane trimethacrylate; tetraallyloxyethane; triallyl cyanurate; tetramethylene diacrylate; and polyethylene glycol dimethacrylate.

19. The thermoplastic elastomer composition of claim 1, wherein the rubber disperse phase comprises at least one poly(perfluoroalkyl (meth)acrylate).

20. A molded, extruded, or shaped article comprising the composition of claim 1.

21. A wire or cable comprising a coating comprising the composition of claim 1.

22. An automotive primary cable comprising a coating comprising the composition of claim 1.

23. A molded, extruded, or shaped article comprising the composition of claim 11.

24. A wire or cable comprising a coating comprising the composition of claim 11.

25. An automotive primary cable comprising a coating comprising the composition of claim 11.

* * * * *